(12) United States Patent
Han et al.

(10) Patent No.: US 12,450,313 B2
(45) Date of Patent: Oct. 21, 2025

(54) CHART PATTERN RECOGNITION SYSTEM AND METHOD

(71) Applicant: National Tsing Hua University, Hsinchu (TW)

(72) Inventors: Chuan-Hsiang Han, Hsinchu (TW); Jyh-Shing Jang, Taipei (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 18/733,892

(22) Filed: Jun. 5, 2024

(65) Prior Publication Data

US 2025/0156501 A1    May 15, 2025

(30) Foreign Application Priority Data

Nov. 10, 2023   (TW) .................................. 112143450

(51) Int. Cl.
  *G06F 18/22*   (2023.01)
  *G06F 18/10*   (2023.01)
(52) U.S. Cl.
  CPC .............. *G06F 18/22* (2023.01); *G06F 18/10* (2023.01)

(58) Field of Classification Search
  CPC .................................. G06F 18/22; G06F 18/10
  See application file for complete search history.

(56) References Cited

U.S. PATENT DOCUMENTS

2008/0027880 A1 *  1/2008  Yu ........................ G06Q 40/06
                                                                705/36 R

* cited by examiner

*Primary Examiner* — Truong V Vo

(57) ABSTRACT

A chart pattern recognition method includes pre-processing a chart pattern group to be compared to obtain the first chart pattern data to be compared based on time and space; normalizing the first chart pattern data to be compared and the first historical chart pattern data from a database to obtain the second chart pattern data to be compared and the second historical chart pattern data; comparing the second chart pattern data to be compared with the second historical chart pattern data to obtain multiple similarity scores of the second chart pattern data to be compared and the second historical chart pattern data; sorting the multiple similarity scores, the corresponding second chart pattern data to be compared, and the corresponding first historical chart pattern data; and obtaining first historical chart pattern data with a maximum similarity score.

10 Claims, 4 Drawing Sheets

CHART PATTERN RECOGNITION SYSTEM AND METHOD

FIELD OF THE INVENTION

The present invention relates to a quantitative analysis technology for chart pattern recognition, and more particularly to a chart pattern recognition system and method.

BACKGROUND OF THE INVENTION

Chart patterns are based on the belief that history repeats itself, so chart patterns are identified by the rule of thumb through the induction of a large amount of historical data. In practice, chart pattern recognition is considered to possess the functionality of predicting prices as information to provide excess returns. It is often used as a reference signal for trading financial assets and is a method for technical analysis. However, there are relatively few literatures on stock price chart patterns due to that the determination of chart patterns varies from person to person and personal experience makes it difficult for quantification. From the perspective of machine learning, chart pattern recognition automation is regarded as a relatively complex classification problem. In addition, when traders or analysts observe various types of chart graphs, it is impossible to identify and track dynamic changes of various patterns of various assets on a large scale in practice due to that the number of chart patterns that each person can track at the same time is limited and the assets that can be observed and traded are also limited.

SUMMARY OF THE INVENTION

The present invention provides a complete and automatic chart pattern recognition system and method, which assists in identifying chart patterns that meet pattern requirements through a hardware matching algorithm.

The chart pattern recognition system provided by the present invention includes a database configured to store multiple pieces of first historical chart pattern data, a non-volatile memory configured to store a chart pattern recognition method, and a processing circuit coupled to the database and the non-volatile memory and configured to execute the chart pattern recognition method. The chart pattern recognition method includes: pre-processing a chart pattern group to be compared to obtain multiple pieces of first chart pattern data to be compared based on time and space; normalizing the multiple pieces of first chart pattern data to be compared and the multiple pieces of first historical chart pattern data to obtain multiple pieces of second chart pattern data to be compared and multiple pieces of second historical chart pattern data; comparing the multiple pieces of second chart pattern data to be compared with the multiple pieces of second historical chart pattern data to obtain multiple similarity scores of the multiple pieces of second chart pattern data to be compared and the multiple pieces of second historical chart pattern data; sorting the multiple similarity scores, the multiple pieces of second chart pattern data to be compared corresponding to the multiple similarity scores, and the multiple pieces of first historical chart pattern data corresponding to the multiple pieces of second historical chart pattern data corresponding to the multiple pieces of second chart pattern data to be compared; and obtaining first historical chart pattern data with a maximum similarity score.

The chart pattern recognition method provided by the present invention is stored in the non-volatile memory and executed by the processing circuit. The method includes: pre-processing a chart pattern group to be compared to obtain multiple pieces of first chart pattern data to be compared based on time and space; normalizing the multiple pieces of first chart pattern data to be compared and the multiple pieces of first historical chart pattern data from the database to obtain multiple pieces of second chart pattern data to be compared and multiple pieces of second historical chart pattern data; comparing the multiple pieces of second chart pattern data to be compared with the multiple pieces of second historical chart pattern data to obtain multiple similarity scores of the multiple pieces of second chart pattern data to be compared and the multiple pieces of second historical chart pattern data; sorting the multiple similarity scores, the multiple pieces of second chart pattern data to be compared corresponding to the multiple similarity scores, and the multiple pieces of first historical chart pattern data corresponding to the multiple pieces of second historical chart pattern data corresponding to the multiple pieces of second chart pattern data to be compared; and obtaining first historical chart pattern data with a maximum similarity score.

In an embodiment of the present invention, the step of comparing the multiple pieces of second chart pattern data to be compared with the multiple pieces of second historical chart pattern data includes: transforming the multiple pieces of second chart pattern data to be compared and the multiple pieces of second historical chart pattern data through Fourier transform to compare the multiple pieces of second chart pattern data to be compared with the multiple pieces of second historical chart pattern data on a frequency domain to obtain the multiple similarity scores.

In an embodiment of the present invention, the step of comparing the multiple pieces of second chart pattern data to be compared with the multiple pieces of second historical chart pattern data includes: comparing the multiple pieces of second chart pattern data to be compared with the multiple pieces of second historical chart pattern data on a normalized vector through a query by singing/humming method to obtain the multiple similarity scores.

In an embodiment of the present invention, the step of pre-processing the chart pattern group to be compared to obtain the multiple pieces of first chart pattern data to be compared based on the time and space includes: vectorizing the chart pattern group to be compared to obtain third chart pattern data to be compared based on time; and linearly scaling the third chart pattern data to be compared based on the time and space to obtain the multiple pieces of first chart pattern data to be compared.

In an embodiment of the present invention, the chart pattern group to be compared includes a compared line and a reference line.

The chart pattern recognition system and method provided by the present invention may scale original historical price data and pattern data to be compared in time and space and compare an error or a similarity between graphs after processing the data to be with the same time length and have the advantages of improving the accuracy of graph identification, globally processing the data, enhancing the algorithm efficiency, and adapting to different computing platforms and parallel processing due to the use of the Fourier transform and the query by singing/humming method.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

To make the objective, the technical solutions and advantages of the present invention clearer, the present invention is further described in detail below in conjunction with the accompanying drawings and the embodiments. It should be understood that the specific embodiments described herein are only for explaining but not for limiting the present invention. All other embodiments obtained by those of ordinary skill in the art based on the embodiments of the present invention without creative efforts should fall within the scope of protection of the present invention.

Moreover, it should be noted that in the embodiment of the present invention, the coupling includes a direct electrical connection and an electrical connection through another component, module, or device. The "coupling" in the description below includes these connections, and will not be repeated in the description below.

Figure 1:
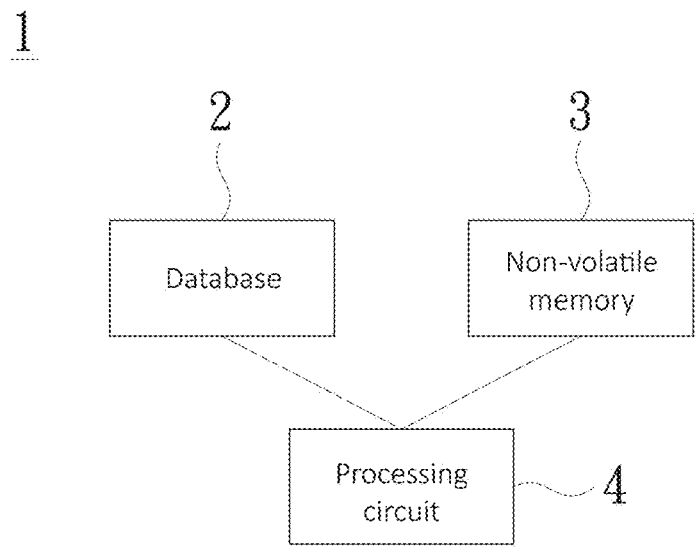
FIG. 1 is a block diagram of a chart pattern recognition system provided by an embodiment of the present invention.

A reference is made to FIG. 1, which is a block diagram of a chart pattern recognition system provided by an embodiment of the present invention. A chart pattern recognition system 1 provided by an embodiment of the present invention includes a database 2, a non-volatile memory 3, and a processing circuit 4, where the processing circuit 4 is coupled to the database 2 and the non-volatile memory 3. The database 2 is configured to store multiple pieces of first historical chart pattern data, such as historical stock price chart patterns. The non-volatile memory 3 is configured to store a chart pattern recognition method provided by the present invention. The processing circuit 4 is configured to execute a chart pattern recognition method.

Figure 2:
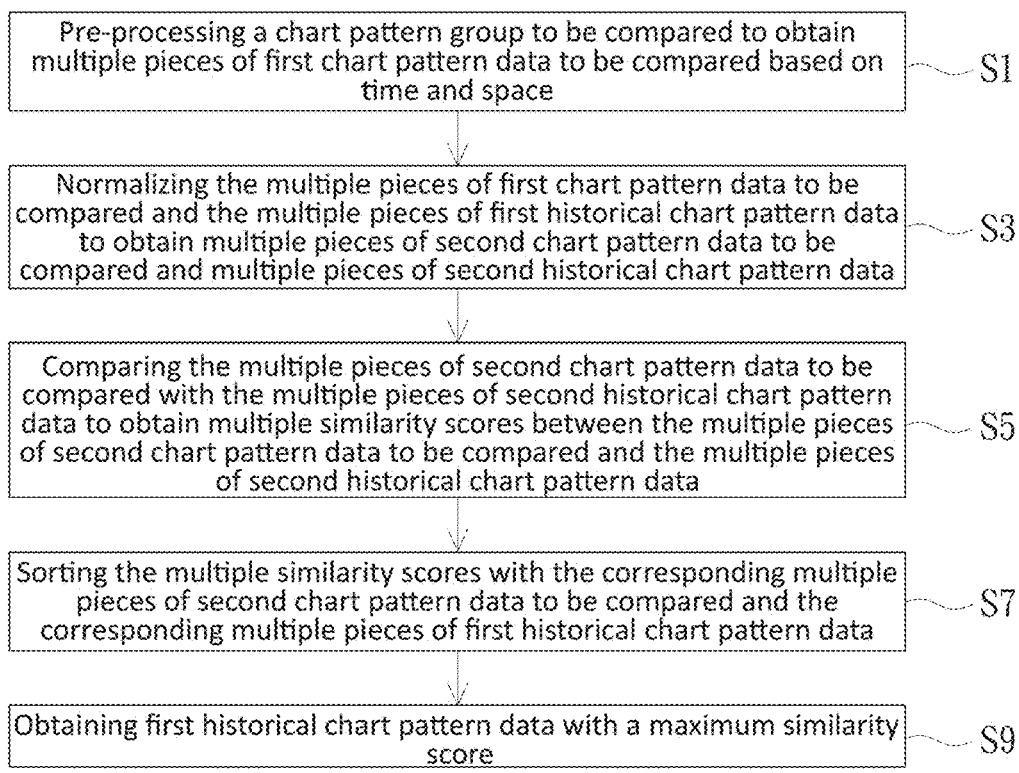
FIG. 2 is a flowchart of a chart pattern recognition method provided by an embodiment of the present invention.
Figure 3:
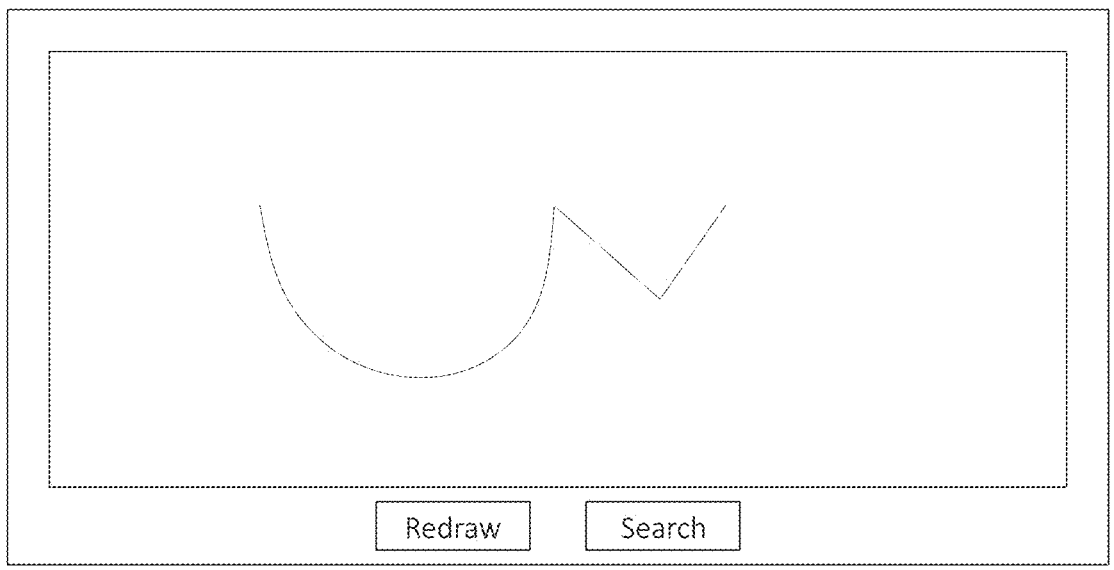
FIG. 3 is a schematic diagram of a chart pattern group to be compared provided by an embodiment of the present invention.
Figure 4:
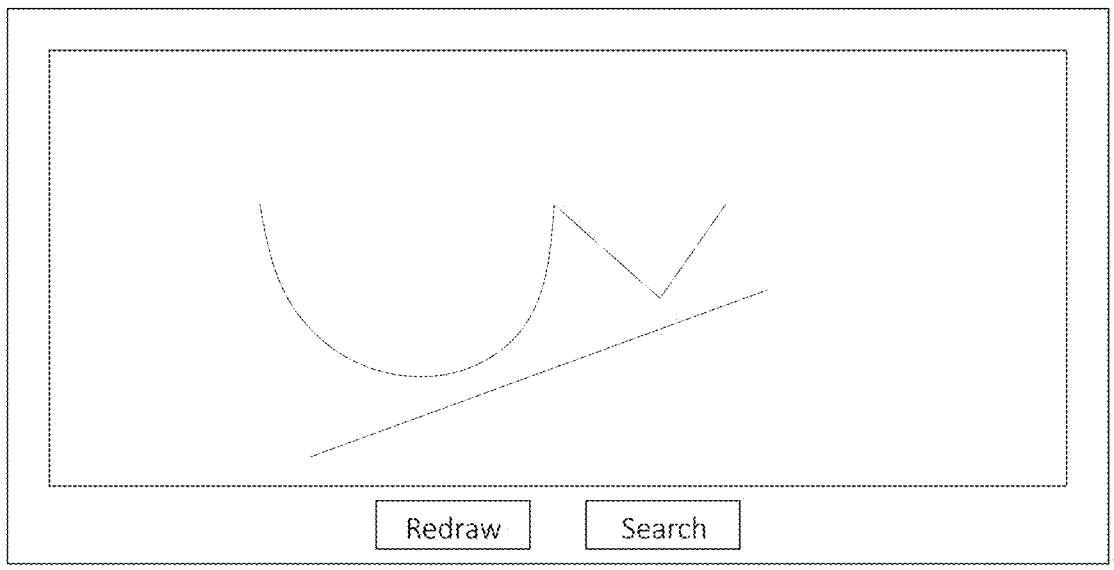
FIG. 4 is a schematic diagram of a chart pattern group to be compared provided by another embodiment of the present invention.

A reference is made to FIG. 2, which is a flowchart of a chart pattern recognition method provided by an embodiment of the present invention. A chart pattern recognition method provided by an embodiment of the present invention is executed by a processing circuit 4 and includes the following steps. In step S1, a chart pattern group to be compared is preprocessed to obtain multiple pieces of first chart pattern data to be compared based on a time period. In detail, when the chart pattern group to be compared is received, the processing circuit 4 preprocesses the chart pattern group to be compared, where the received chart pattern group to be compared may be input by, for example, an input device such as a mouse, a keyboard, a touchpad, and a touch screen, or may be obtained by other input tools capable of drawing geometric shapes. The present invention is not limited to this. In addition, the chart pattern group to be compared may include a compared line as shown in FIG. 3 or may include a compared line and a reference line as shown in FIG. 4, and it should be noted that since the compared line may be a hand-drawn chart pattern, the reference line is added to be provided for the processing circuit 4 to determine an inclination trend of the compared line to adjust the compared line.

Figure 5:
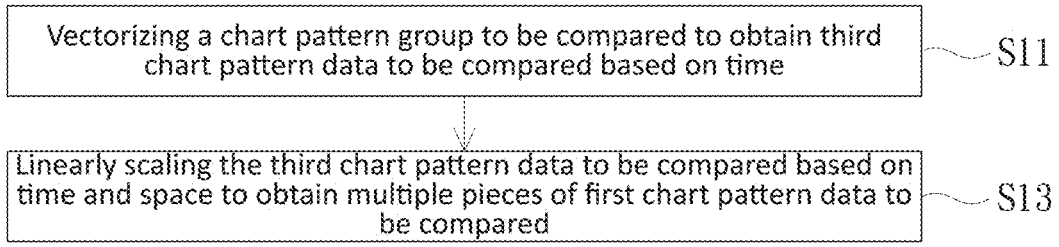
FIG. 5 is a flowchart of pre-processing a chart pattern group to be compared provided by an embodiment of the present invention.

A reference is made to FIG. 5, which is a flowchart of pre-processing a chart pattern group to be compared provided by an embodiment of the present invention. Step S1 further includes the following steps. In step S11, the chart pattern group to be compared is vectorized to obtain third chart pattern data to be compared based on time. In detail, since the chart pattern group to be compared may be a hand-drawn geometric shape without a time unit, the chart pattern group to be compared is vectorized to change to the chart pattern data to be compared based on time, that is, the chart pattern data to be compared with the time unit. In step S13, the third chart pattern data to be compared is linearly scaled based on the time and space (amplitude) to obtain the multiple pieces of first chart pattern data to be compared. In detail, the third chart pattern data to be compared is, for example, chart pattern data to be compared with time of 35 days, and may be scaled in time to multiple pieces of chart pattern data to be compared with time of 25 days, 45 days, 55 days, and 65 days. In addition, by analogy, similar to being scaled in time, the third chart pattern data to be compared may also be scaled in space (amplitude).

Referring to FIG. 2 again, a chart pattern recognition method provided by an embodiment of the present invention is executed by a processing circuit 4 and includes the following steps. In step S3, the multiple pieces of first chart pattern data to be compared and multiple pieces of first historical chart pattern data from a database 2 are standardized to obtain multiple pieces of second chart pattern data to be compared and multiple pieces of second historical chart pattern data. In detail, the second chart pattern data to be compared and the second historical chart pattern data generated by normalizing the first chart pattern data to be compared and the first historical chart pattern data have the same standard and can be compared.

In step S5, the multiple pieces of second chart pattern data to be compared are compared with the multiple pieces of second historical chart pattern data to obtain multiple similarity scores of the multiple pieces of second chart pattern data to be compared and the multiple pieces of second historical chart pattern data. In detail, the higher the comparative similarity between the second chart pattern data to be compared and the second historical chart pattern data is, the higher the score is, and vice versa.

Figure 6:
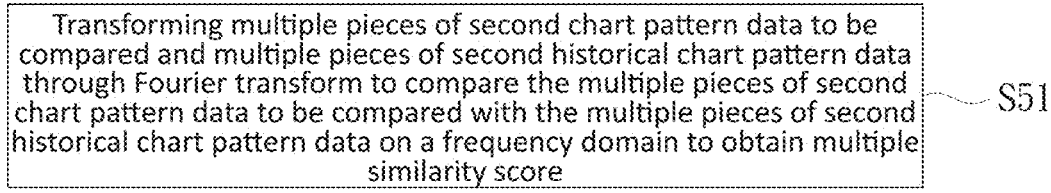
FIG. 6 is a flowchart of comparing second chart pattern data to be compared with second historical chart pattern data provided by an embodiment of the present invention.

A reference is made to FIG. 6, which is a flowchart of comparing second chart pattern data to be compared with second historical chart pattern data provided by an embodiment of the present invention. Step S5 further includes the following steps. In step S51, the multiple pieces of second chart pattern data to be compared and the multiple pieces of second historical chart pattern data are transformed through Fourier transform to compare the multiple pieces of second chart pattern data to be compared with the multiple pieces of second historical chart pattern data on a frequency domain to obtain the multiple similarity scores. In detail, the second chart pattern data to be compared and the second historical chart pattern data are transformed from time domain data to frequency domain data through Fourier transform, for example, analog data is transformed into digital data, such that similarity comparison can be performed to find out historical chart pattern data with a maximum score.

Figure 7:
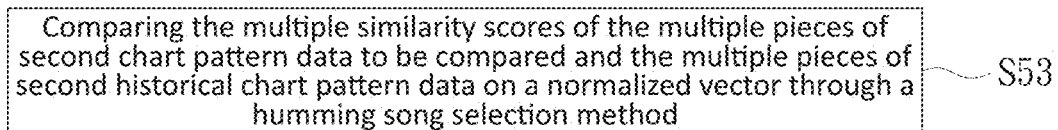
FIG. 7 is a flowchart of comparing second chart pattern data to be compared with second historical chart pattern data provided by another embodiment of the present invention.

A reference is made to FIG. 7, which is a flowchart of comparing second chart pattern data to be compared with second historical chart pattern data provided by another embodiment of the present invention. Step S5 further includes the following steps. In step S53, the multiple pieces of second chart pattern data to be compared are compared with the multiple pieces of second historical chart pattern data on a normalized vector through a query by singing/humming method to obtain the multiple similarity scores. In detail, the second chart pattern data to be compared and the second historical chart pattern data are subjected to tracking and analyzing through the query by singing/humming method, such that similarity comparison can be performed to find out historical chart pattern data with a maximum score. In addition, it should be noted that step S51 and step S53 may be used simultaneously or alternatively. The present invention is not limited to this.

Figure 8:
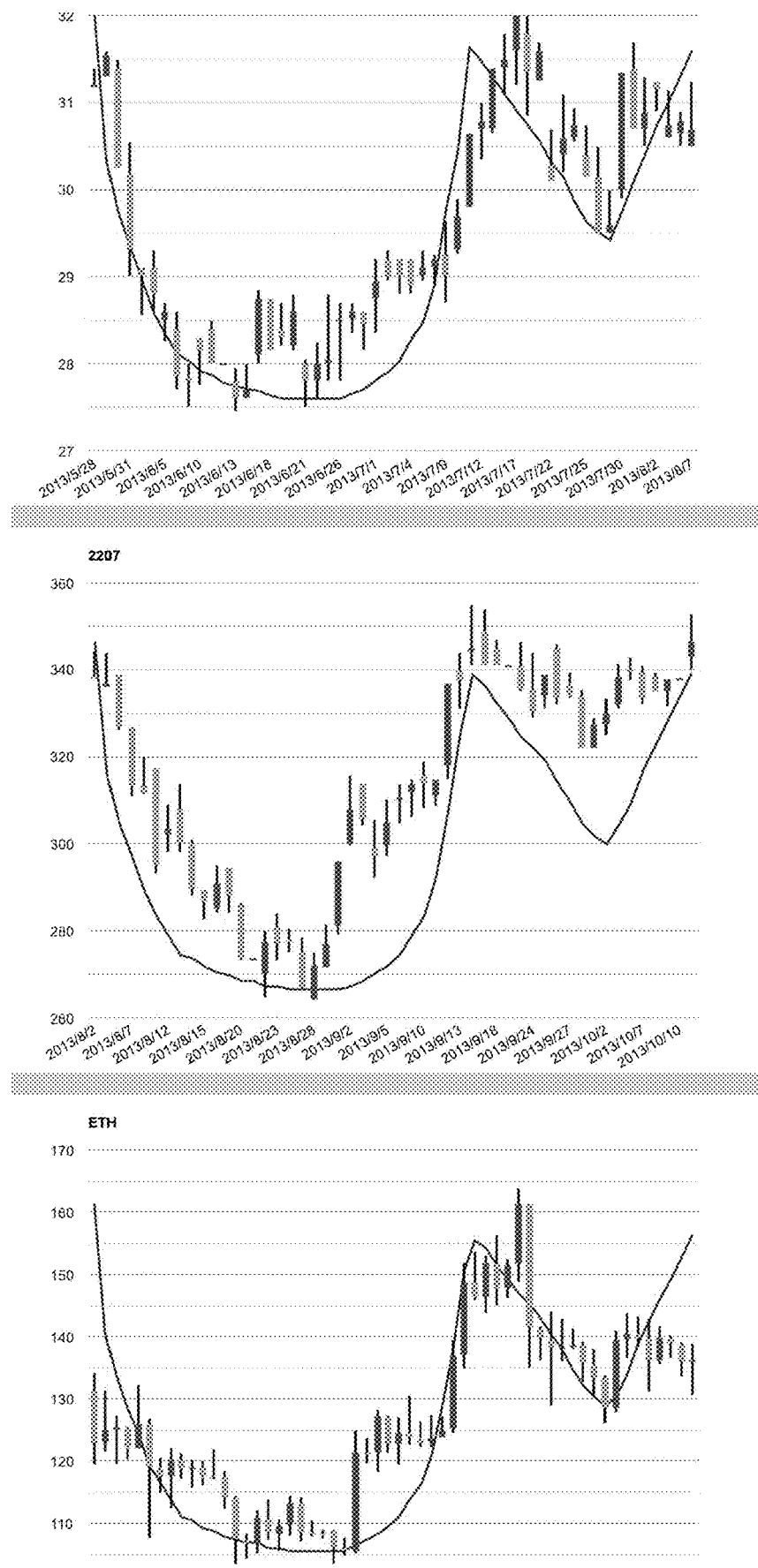
FIG. 8 is a schematic diagram of sorting similarity scores, corresponding second chart pattern data to be compared, and corresponding first historical chart pattern data provided by an embodiment of the present invention.

Referring to FIG. 2 again, a chart pattern recognition method provided by an embodiment of the present invention is executed by a processing circuit 4 and includes the following steps. In step S7, the multiple similarity scores, the multiple pieces of second chart pattern data to be compared corresponding to the multiple similarity scores, and the multiple pieces of first historical chart pattern data corresponding to the multiple pieces of second historical chart pattern data corresponding to the multiple pieces of second chart pattern data to be compared are sorted. A reference is made to FIG. 8, which is a schematic diagram of sorting similarity scores, corresponding second chart pattern data to be compared, and corresponding first historical chart pattern data provided by an embodiment of the present invention. This embodiment uses an example where the top three second chart pattern data to be compared and first historical chart pattern data with maximum similarity scores are arranged in order, and all the second chart pattern data to be compared and first historical chart pattern data may also be arranged. The present invention is not limited to this.

In step S9, first historical chart pattern data with a maximum similarity score is obtained. In detail, the similarity scores, the corresponding second chart pattern data to be compared, and the corresponding first historical chart pattern data are sorted to obtain the first historical chart pattern data with the maximum similarity score for further display.

In summary, the chart pattern recognition system and method provided by the present invention may scale original historical price data and pattern data to be compared in time and space and compare an error or a similarity between graphs after processing the data to be with the same time length and have the advantages of improving the accuracy of graph identification, globally processing the data, enhancing the algorithm efficiency, and adapting to different computing platforms and parallel processing due to the use of the Fourier transform and the query by singing/humming method.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation to encompass all such modifications and similar structures.

What is claimed is:

1. A chart pattern recognition system, comprising:
 a database, configured to store multiple pieces of first historical chart pattern data;
 a non-volatile memory, configured to store a chart pattern recognition method; and
 a processing circuit, coupled to the database and the non-volatile memory and configured to execute the chart pattern recognition method, wherein the chart pattern recognition method comprises steps of:
 pre-processing a chart pattern group to be compared to obtain multiple pieces of first chart pattern data to be compared based on time and space;
 normalizing the multiple pieces of first chart pattern data to be compared and the multiple pieces of first historical chart pattern data to obtain multiple pieces of second chart pattern data to be compared and multiple pieces of second historical chart pattern data;
 comparing the multiple pieces of second chart pattern data to be compared with the multiple pieces of second historical chart pattern data to obtain multiple similarity scores between the multiple pieces of second chart pattern data to be compared and the multiple pieces of second historical chart pattern data;
 sorting the multiple similarity scores with the corresponding multiple pieces of second chart pattern data to be compared and the corresponding multiple pieces of first historical chart pattern data; and
 obtaining first historical chart pattern data with a maximum similarity score.

2. The chart pattern recognition system according to claim 1, wherein the step of comparing the multiple pieces of second chart pattern data to be compared with the multiple pieces of second historical chart pattern data comprises:
 transforming the multiple pieces of second chart pattern data to be compared and the multiple pieces of second historical chart pattern data through Fourier transform to compare the multiple pieces of second chart pattern data to be compared with the multiple pieces of second historical chart pattern data to obtain the multiple similarity scores.

3. The chart pattern recognition system according to claim 1, wherein the step of comparing the multiple pieces of second chart pattern data to be compared with the multiple pieces of second historical chart pattern data comprises:
 comparing the multiple pieces of second chart pattern data to be compared with the multiple pieces of second historical chart pattern data on a normalized vector through a query by singing/humming method to obtain the multiple similarity scores.

4. The chart pattern recognition system according to claim 1, wherein the step of pre-processing the chart pattern group to be compared to obtain the multiple pieces of first chart pattern data to be compared based on a time period comprises:

vectorizing the chart pattern group to be compared to obtain third chart pattern data to be compared based on time; and linearly scaling the third chart pattern data to be compared based on the time and space to obtain the multiple pieces of first chart pattern data to be compared.

5. The chart pattern recognition system according to claim 1, wherein the chart pattern group to be compared comprises a compared line and a reference line.

6. A chart pattern recognition method stored in a non-volatile memory and executed by a processing circuit, the chart pattern recognition method comprising steps of:

pre-processing a chart pattern group to be compared to obtain multiple pieces of first chart pattern data to be compared based on time and space;

normalizing the multiple pieces of first chart pattern data to be compared and multiple pieces of first historical chart pattern data from a database to obtain multiple pieces of second chart pattern data to be compared and multiple pieces of second historical chart pattern data;

comparing the multiple pieces of second chart pattern data to be compared with the multiple pieces of second historical chart pattern data to obtain multiple similarity scores of the multiple pieces of second chart pattern data to be compared and the multiple pieces of second historical chart pattern data;

sorting the multiple similarity scores, the multiple pieces of second chart pattern data to be compared corresponding to the multiple similarity scores, and the multiple pieces of first historical chart pattern data corresponding to the multiple pieces of second historical chart pattern data corresponding to the multiple pieces of second chart pattern data to be compared; and obtaining first historical chart pattern data with a maximum similarity score.

7. The chart pattern recognition method according to claim 6, wherein the step of comparing the multiple pieces of second chart pattern data to be compared with the multiple pieces of second historical chart pattern data comprises:

transforming the multiple pieces of second chart pattern data to be compared and the multiple pieces of second historical chart pattern data through Fourier transform to compare the multiple pieces of second chart pattern data to be compared with the multiple pieces of second historical chart pattern data to obtain the multiple similarity scores.

8. The chart pattern recognition method according to claim 6, wherein the step of comparing the multiple pieces of second chart pattern data to be compared with the multiple pieces of second historical chart pattern data comprises:

comparing the multiple pieces of second chart pattern data to be compared with the multiple pieces of second historical chart pattern data on a normalized vector through a query by singing/humming method to obtain the multiple similarity scores.

9. The chart pattern recognition method according to claim 6, wherein the step of pre-processing the chart pattern group to be compared to obtain the multiple pieces of first chart pattern data to be compared based on a time period comprises:

vectorizing the chart pattern group to be compared to obtain third chart pattern data to be compared based on time; and linearly scaling the third chart pattern data to be compared based on the time and space to obtain the multiple pieces of first chart pattern data to be compared.

10. The chart pattern recognition method according to claim 6, wherein the chart pattern group to be compared comprises a compared line and a reference line.

* * * * *